(12) United States Patent
Zlotnick et al.

(10) Patent No.: US 11,093,254 B2
(45) Date of Patent: Aug. 17, 2021

(54) ADAPTIVE SYSTEM FOR SMART BOOT SEQUENCE FORMATION OF VMS FOR DISASTER RECOVERY

(71) Applicant: EMC IP Holding Company LLC, Hopkinton, MA (US)

(72) Inventors: David Zlotnick, Tel Aviv (IL); Assaf Natanzon, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 249 days.

(21) Appl. No.: 16/391,124

(22) Filed: Apr. 22, 2019

(65) Prior Publication Data
US 2020/0334043 A1    Oct. 22, 2020

(51) Int. Cl.
| | |
|---|---|
| *G06F 9/00* | (2006.01) |
| *G06F 15/177* | (2006.01) |
| *G06F 9/4401* | (2018.01) |
| *G06F 9/455* | (2018.01) |
| *G06F 11/34* | (2006.01) |

(52) U.S. Cl.
CPC .......... *G06F 9/441* (2013.01); *G06F 9/45558* (2013.01); *G06F 11/3495* (2013.01); *G06F 2009/45575* (2013.01)

(58) Field of Classification Search
CPC ................. G06F 9/441; G06F 9/45558; G06F 2009/45575; G06F 2201/815; G06F 11/1417; G06F 11/1464; G06F 11/3495; G06F 11/3688
See application file for complete search history.

(56) References Cited

U.S. PATENT DOCUMENTS

| | | | |
|---|---|---|---|
| 2009/0094603 A1* | 4/2009 | Hiltgen | G06F 9/45558 718/1 |
| 2016/0048408 A1* | 2/2016 | Madhu | G06F 11/2023 718/1 |
| 2017/0168903 A1* | 6/2017 | Dornemann | G06F 9/45558 |
| 2018/0018191 A1* | 1/2018 | Bradshaw | G06F 9/45558 |
| 2019/0073276 A1* | 3/2019 | Yuen | G06F 11/3419 |

* cited by examiner

*Primary Examiner* — Nitin C Patel
(74) *Attorney, Agent, or Firm* — Workman Nydegger

(57) ABSTRACT

One example method includes receiving input concerning a boot order sequence, where the input includes VM metadata, entering a training phase which includes generating a boot sequence rule based on the input, using the boot sequence rule to generate a proposed boot sequence, performing the proposed boot sequence, and gathering information concerning performance of the proposed boot sequence. The gathered information can be used as a basis to generate a modified boot sequence.

20 Claims, 4 Drawing Sheets

ADAPTIVE SYSTEM FOR SMART BOOT SEQUENCE FORMATION OF VMS FOR DISASTER RECOVERY

FIELD OF THE INVENTION

Embodiments of the present invention generally relate to data protection. More particularly, at least some embodiments of the invention relate to systems, hardware, software, computer-readable media, and methods for creating and implementing a virtual machine (VM) boot sequence in disaster recovery (DR) and testing scenarios.

BACKGROUND

Enterprises generate significant amounts of important data that is typically preserved in some type of data protection environment. Such data protection environments help to ensure that the data is recoverable in the event that a disaster occurs that compromises, or prevents access to, the data. Typical data protection environments employ a variety of hardware and software in order to provide data security, access, and availability.

Thus, disaster recovery planning and implementation are critical processes for organizations, required to guarantee business continuity. However, for large systems, disaster recovery operations are complex and can be error prone. One of the challenges when performing disaster recovery in virtualized environments is to configure the particular order the virtual machines (VMs) should be booted during recovery of the production environment. The boot order can be important because, for example, a particular VM may have a dependent relation with other VM. Thus, the independent VM should be booted before the dependent VM.

However the process of configuring the boot order is both complex and error prone, and is complicating the initial setup of the above disaster recovery tools. For example, an administrator has to manually configure the order of the virtual machine boot sequence. This can take a significant amount of time, and may hold back the initial setup of disaster recovery tools, thereby increasing the risk for the organization.

As another example, the boot order configuration is often based on trial and error. In particular, since configuration is manual and can involve a significant number of VMs, the boot order configuration process is inherently error prone. For example, the administrator may configure the system incorrectly and, as a result, a failure is experienced during an attempted disaster recovery. Such a failure may occur for various reasons. To illustrate with an example, a DR operation may fail due to a race condition in which dependent VM were booted with the same priority as the VM upon which they are dependent. The race condition could likely be avoided by a properly configured boot sequence.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
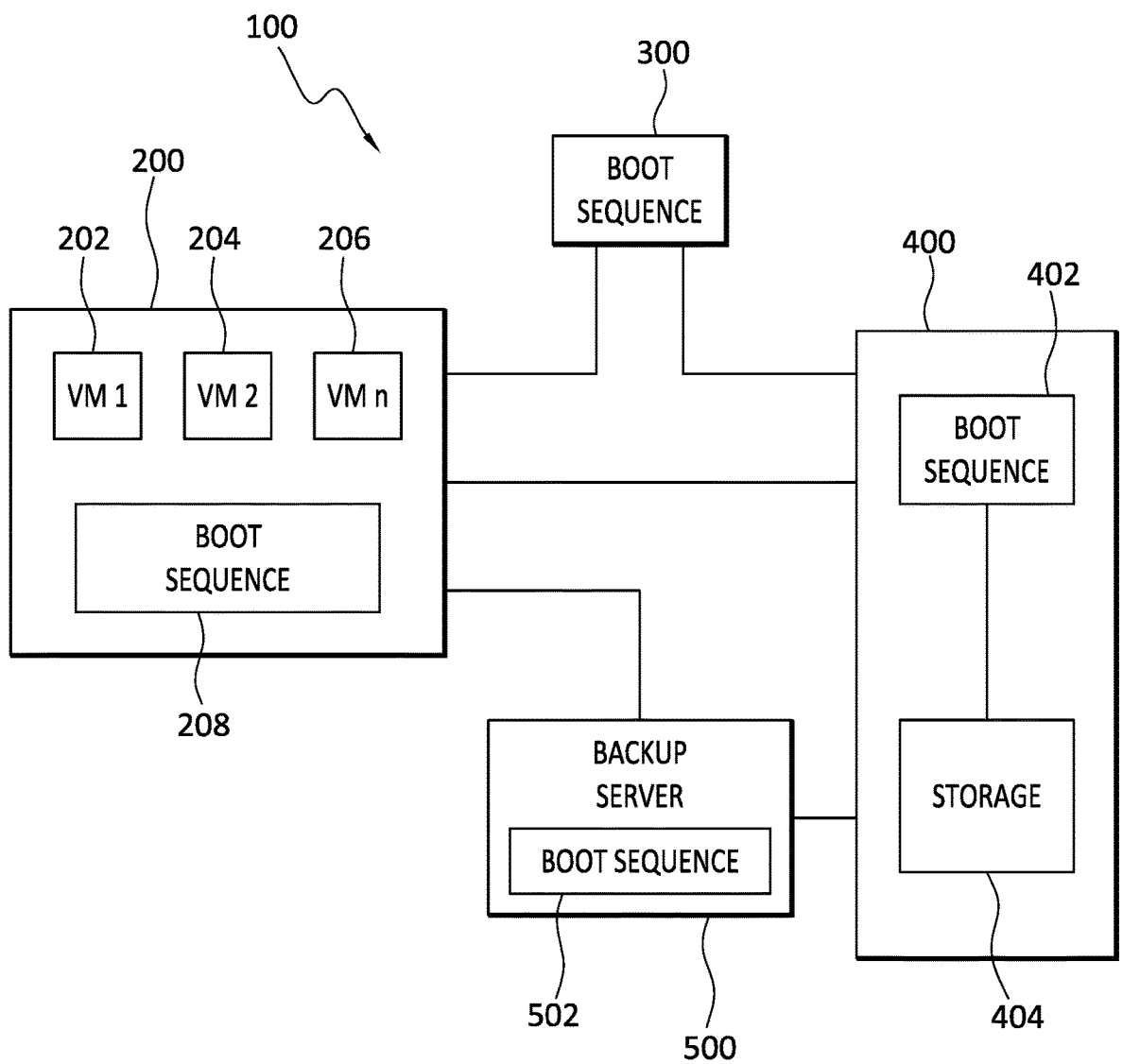
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods for creating and implementing a virtual machine (VM) boot sequence in disaster recovery (DR) and testing scenarios.

More particularly, example embodiments of the invention include smart and adaptive systems for automating a boot sequence generation process. In some embodiments at least, generation of the boot sequences is implemented in connection with machine learning processes and algorithms. Among other things, example embodiments may reduce the entry barriers for a successful implementation of disaster recovery in the customer organization by providing for relatively fast and accurate boot sequence generation and implementation. As well, example embodiments of the invention are able to learn from monitoring DR test processes and can use the information obtained from the monitoring to optimize the boot sequence of the entire system to improve the failover procedure.

In more detail, embodiments of the invention embrace, among other things, a smart and adaptive system that is able to automatically configure the boot sequence logic of multiple VMs for a disaster recovery plan for an entire system. This system collects data analytics from the VMs on the production site and from DR test trial runs, and then calculates, based on this information, the VM boot order for optimized DR performance. The system administrator can provide manual feedback on the system automatic calculation in order to tune the boot order, and the system will learn from the user feedback to fine tune its boot sequence logic.

Advantageously then, some embodiments of the invention may provide various benefits and improvements relative to the configuration and operation of conventional hardware, software, systems and methods. To illustrate, an embodiment of the invention may provide processes for generating a boot sequence that is based on real world experience and conditions. Another advantage of some embodiments is that they can reduce the occurrence of human error, and consequent problems, in the development and implementation of a DR boot sequence. As well, some embodiments can dynamically modify the boot sequence in response to changes in the operating environment. Finally, some embodiments can dynamically modify the boot sequence in response to data gathered during actual and/or simulated DR operations. Dynamic modification of the boot sequence can occur with, or without, human input.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms, as well as the Dell-EMC RecoverPoint and the VMWare SRM (Site Recovery Manager) platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example operating environment 100 in FIG. 1 is a data protection environment that comprises a production site 200, a boot sequence service 300, a datacenter 400, and a backup and restore server 500. The production site 200, which may take the form of an enterprise or organization premises for example, may include any number 'n' of VMs, such as VM1 202, VM2 204, and VMn 206, for example. In general, the VMs may be involved in operations of computing systems and other systems at the production site. As used herein, the term 'VM' is broad in scope and refers generally to a virtualized representation of any combination of hardware and/or software. The disclosed VMs are not limited to performance of any particular functionality or group of functionalities. Some example VMs in connection with which embodiments of the invention may be implemented are virtualizations of components that include, but are not limited to, file systems, applications, databases, disks, processors, storage elements, memory elements, software, hardware, and any combination of these.

The production site 200 may also include a boot sequence service 208. In general, the boot sequence service 208 serves to perform the various functions disclosed herein concerning the definition, implementation, and modification, of VM boot sequences, such as may be employed in DR systems and DR scenarios. Such functions may also include identifying and polling the production site 200 VMs 202, 204 and 206. The boot sequence service 208 may comprise, or consist of, a boot sequence algorithm.

With continued attention to FIG. 1, some embodiments may provide for a boot sequence service 300 that is not hosted at the production site 200 but, instead, is a standalone service with which the production site 200 communicates. Other than the fact that the boot sequence service 300 does not reside at the production site 200, the boot sequence service 300 may be identical in every other respect to the boot sequence service 208, although that is not necessarily required. In addition to communicating with the production site 200, the boot sequence service 300 may also communicate with the datacenter 400.

In an alternative configuration, the datacenter 400 may host a boot sequence service 402, and the datacenter 400 can include other elements such as storage 404. In this configuration, the boot sequence service 402 can communicate directly with the production site 200 and/or by way of a backup and restore server 500, discussed below. The datacenter 400 may, but is not required to, be a public cloud site such as Amazon AWS, Microsoft Azure, or Google Cloud.

In still other embodiments, a boot sequence service can communicate with, or be integrated as an element of, a backup and restore service or application, which may be hosted on a backup and restore server 500 that communicates with the production site 200 and datacenter 400. Accordingly, FIG. 1 discloses a configuration where a boot sequence service 502 is integrated into the backup and restore server 500. In this configuration, the boot sequence service 502 can communicate with the production site 200 and the datacenter 400.

With continued reference to the example arrangements in FIG. 1, it is noted that the boot sequence service, however and wherever embodied, can receive input, which may be in the form of user input, training data, test data, features, expected results of the implementation of a boot sequence, production data, feedback, or other input. Such input may, but need not necessarily, be provided by way of a user interface (UI), such as a graphical user interface (GUI), or command line interface (CLI), for example. The boot sequence service may also receive input from one or more computing system components including datacenters, production sites, servers, memory, storage, hardware, and software. In addition to receiving input, the boot sequence service also generates output including, but not limited to, a proposed boot sequence or boot order for two or more VMs. As well, the boot sequence service can also report information concerning its operations, such as proposed and/or actual changes to a version of a boot sequence, such as a prior version of a boot sequence.

B. Example Host and Server Configurations

Figure 2:
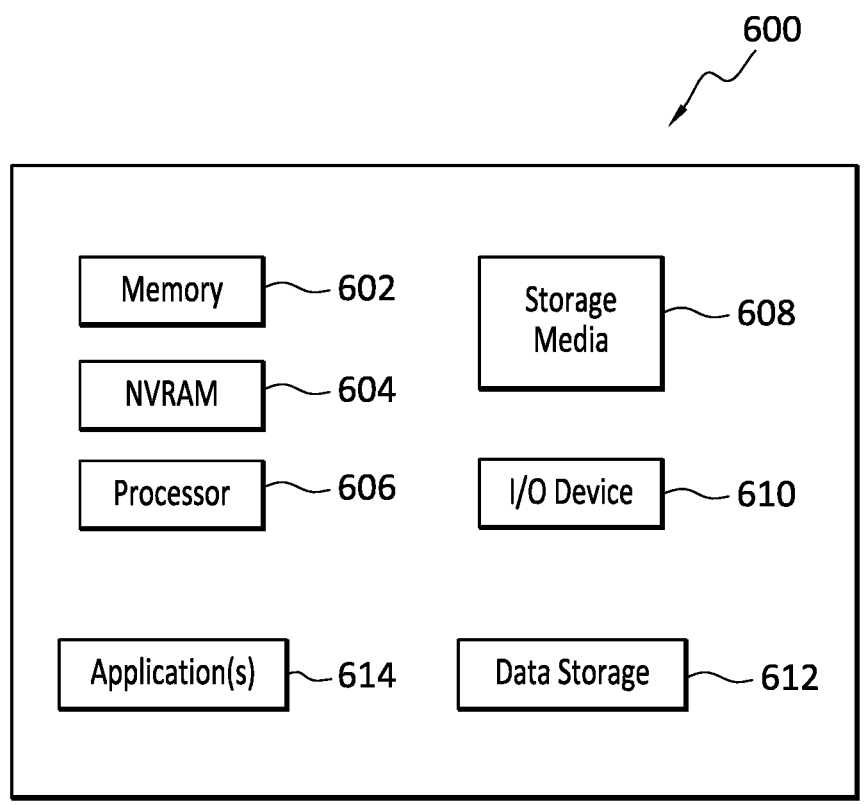
FIG. 2 discloses aspects of an example host configuration.

With reference briefly now to FIG. 2, any one or more of the production site 200, VMs 202 . . . 206, boot sequence service 208, boot sequence service 300, datacenter 400, boot sequence service 402, storage 404, backup and restore server 500, and boot sequence service 502, can take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 2.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components 602 of the physical computing device 600 can take the form of solid state device (SSD) storage. As well, one or more applications 614 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, and restore, operations, boot sequence definition operations, boot sequence execution operations, boot sequence modification operations, disaster recover operations, disaster recovery test operations, and boot sequence test operations.

C. Example System

Figure 3:
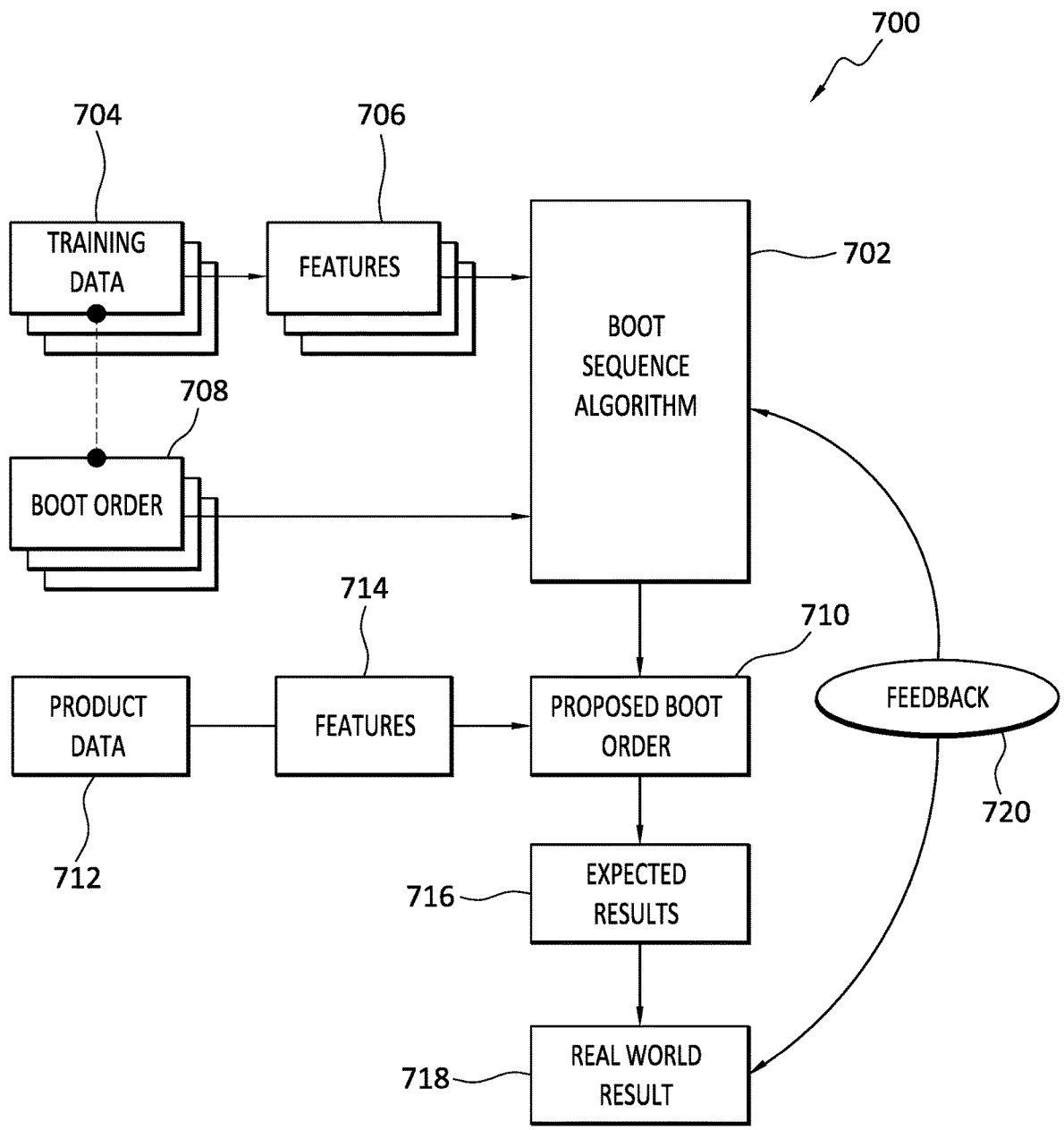
FIG. 3 is an architecture and flow diagram that discloses some general aspects of elements and processes for generating a boot sequence.

With reference now to FIG. 3, details are provided concerning an example system 700 that includes a boot sequence algorithm. Among other things, the system 700 of FIG. 3 implements a machine learning system that automatically calculates and optimizes a boot sequence of multiple VMs for disaster recovery.

As indicated in FIG. 3, the system 700 includes a boot sequence algorithm 702 which, as discussed in more detail below, generates a boot sequence which can then be executed. To that end, the system 700 may be initially trained with training data 704 from which various features 706 may be extracted. For example, the training data 704 may include synthetic data from which the system 700 can establish initial rules for boot order calculations. The training data 704 can be based on, and/or comprise, VM metadata.

Such VM metadata may include, but is not limited to, the type(s) of applications installed on one or more VMs. Such applications can include, for example, database applications, file systems (FS), application servers, which can be any server that hosts instances of one or more applications, and web servers. Still other examples of VM metadata which can be used for training data, and/or as a basis for training data, include VM uptime statistics, VM network and storage configuration information, and VM tags, naming convention and labels.

The inputs to the boot sequence algorithm 702 may comprise, in addition or alternatively to, the training data 704 and features 706, boot order information 708. The boot order information 708 may comprise, or consist of, boot order information that was previously used by the system 700, and/or boot order information generated, for example, by a human user. Additionally, or alternatively, the boot order information 708 may comprise, or consist of, a default boot order that can be used as a starting point by the boot sequence algorithm 702. The default boot order may constitute the best initial guess, whether by a user or the system 700, as to what the boot order should be.

In connection with receipt of the inputs such as the training data 704, features 706, and boot order information 708, the boot sequence algorithm 702 can enter a training phase. In this training phase, these and/or other inputs are used by the boot sequence algorithm 702 to establish an initial set of rules for boot order calculation.

After the training phase, the initial boot sequence rules and other inputs are used by the boot sequence algorithm 702 to generate a proposed boot order 710. For example, a boot sequence rule may specify that a database is priority 2 in the boot order, while a filesystem is priority 1. That is, in this illustrative example, the filesystem should be, and is, restored before the database is restored. As a further example, it may be desired to restore a fileserver prior to restoration of an application server. In this example, a boot sequence rule may specify that the fileserver is priority 1, while the application server is priority 2. It will be appreciated that any type and number of boot sequence rules can be defined and implemented. Moreover, restore priorities can be established for any other component(s) or element(s) of the system 700, examples of which include, but are not limited to, webservers, fileservers, and mail servers, for example.

When the boot sequence algorithm 702 has received the various inputs, including one or more boot sequence rules, the boot sequence algorithm 702 can then generate the proposed boot order 710 based on those inputs. In some embodiments, an administrator or other user can review and edit, by way of a UI, the proposed boot order 710. The proposed boot order 710 is associated with results 716 that are expected to be achieved by implementation of that proposed boot order 710.

After the proposed boot order 710 has been generated by the boot sequence algorithm 702, the system 700 can then automatically test the proposed boot order 710 by running an orchestrated DR test, and collecting the real world telemetry data of the actual system performance with the proposed boot order 710. The collected data can include product data 712 and features 714 such as, but not limited to: per-VM boot success/failure; type of DR errors—e.g. VM crash, hanging VM, and application errors; VM OS boot time; application boot times (e.g. Web Server, App Server, DB); network traffic between VMs; VM CPU, RAM and IO usage over time; overall failover time of the system 700; and, automated post-DR verification tests.

As shown in FIG. 3, implementation of the orchestrated DR test results in the generation of real world results 718, that is, actual results. In some embodiments, the real world results 718 are compared with the expected results 716. This comparison can be used as the basis for making adjustments to the proposed boot order 710, although that is not necessarily required.

For example, using the real world telemetry data collected during performance of the orchestrated DR test as feedback 720, the system 700 calculates and performs a series of adjustments and tuning steps to the proposed boot order 710. Such adjustments and tuning steps can include, but are not limited to, changing the boot order and the associated boot rules to reflect the change in boot order. As another example, tuning and adjustment of the proposed boot order can include reducing the number of boot sequence steps. As well, the proposed boot order can be modified by adding boot sequence steps. Further, a plurality of boot orders can be defined and stored in a library for later use. The particular boot order employed in a DR scenario can then be selected from the library based on the suitability of that boot order for that particular DR scenario.

After a boot order has been modified based on user input, feedback 720 such as real world results, and/or other inputs, the modified boot order can then be implemented in connection with another orchestrated DR test. This process of testing, collecting real world data, modifying the boot sequence, and applying the modified boot sequence, can be performed repeatedly any number of times on various VMs, systems, and configuration from numerous customer environments. The information gathered and/or generated during these processes is to enrich the system 700 knowledge base for optimizing boot sequence configurations.

As indicated by the foregoing examples, embodiments of the system 700 automatically configure the boot sequence logic of multiple VMs for a disaster recovery plan for an entire system. This system collects data analytics from the VMs on the production site and from DR test trial runs, and then calculates, based on this information, the VM boot order for optimized DR performance. The system administrator can provide manual feedback on the system automatic calculation in order to tune the boot order, and the system will learn from the user feedback to fine tune its boot sequence logic. By applying machine learning algorithms, a smart and adaptive system 700 is employed that automates the boot sequence calculation in disaster recovery, by applying. Among other things then, example embodiments of the invention make the setup process of disaster recovery solutions faster and easier, while avoiding the need for manual configuration, and reducing the business continuity risks of organizations.

D. Example Methods

Figure 4:
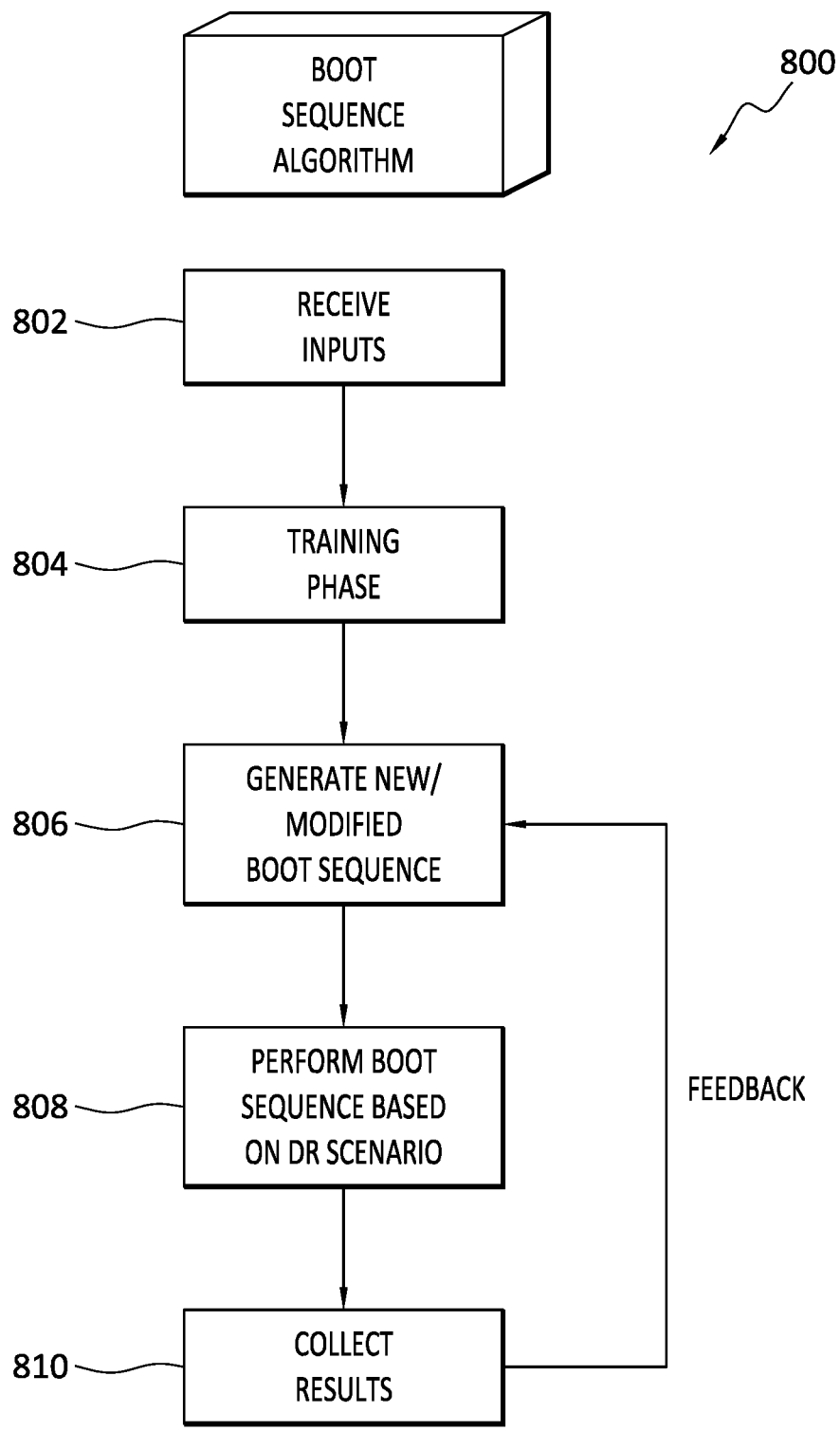
FIG. 4 is a flow diagram that discloses some general aspects of a method for generating a boot sequence.

With attention now to FIG. 4, aspects of example methods are disclosed. One particular method is denoted generally at 800 and concerns the creation and refinement of a boot sequence. Part, or all, of the method 800 may be performed automatically by a boot sequence algorithm without requiring instantiation by a human.

The method 800 begins at 802 where a boot sequence algorithm receives various inputs that will be employed by the boot sequence algorithm in connection with the generation of new and/or modified boot sequences. Such inputs 802 may include, for example, training data that include synthetic data from which the system can establish initial rules for boot order calculations. As disclosed elsewhere herein, some of the training data inputs received 802 can be based on, and/or comprise, VM metadata.

With the inputs received 802, the boot sequence algorithm enters a training phase 804 in which the inputs are used by the boot sequence algorithm to establish an initial set of rules for boot order calculation. Such rules may be based, for example, on the particular VMs that are desired to be restored in a DR scenario, and the relation of those VMs to each other.

The training phase 804 ends when the boot sequence algorithm generates a proposed boot sequence or boot order 806. The proposed boot sequence is generated 806 based on, at least, the inputs 802 and rules generated during the training phase 804. As explained herein, the proposed boot sequence generated at 806 may be either a new, or modified, boot order.

The proposed boot sequence can then be implemented 808 in connection with the performance of a test DR scenario. For example, the occurrence of a disaster may be simulated and then the proposed boot sequence performed 808 in response to the simulated disaster as part of a DR response. Before, during, and/or after, implementation of the proposed boot sequence 808, information is gathered 810 concerning that implementation. The information thus collected 810 can then be used as inputs, that is, feedback, for generation of a new or modified boot sequence.

As indicated in FIG. 4, the processes 806 through 810 can be performed only once, or repeatedly if desired. In some alternative embodiments, the results that have been collected 810 in connection with the implementation of a boot sequence can be used as inputs 802 to the training phase 804. In still other embodiments, the results that have been collected 810 in connection with the implementation of a boot sequence can be used both as inputs 802 to the training phase 804, and also as inputs to the generation 806 of the new/modified boot sequence.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving input concerning a boot order sequence, wherein the input comprises VM (virtual machine) metadata;
   after receiving the input concerning the boot order sequence, entering a training phase which comprises generating a boot sequence rule based on the input;
   after entering the training phase, using the boot sequence rule to generate a proposed boot sequence;
   after generating the proposed boot sequence, performing the proposed boot sequence; and
   after performing the proposed boot sequence, gathering information concerning performance of the proposed boot sequence.

2. The method as recited in claim 1, wherein the input further comprises a default boot sequence.

3. The method as recited in claim 1, wherein the proposed boot sequence identifies an order in which a plurality of VMs are to be restored.

4. The method as recited in claim 3, wherein the order identified by the proposed boot sequence is based upon a respective application type with which each of the plurality of VMs is associated.

5. The method as recited in claim 1, wherein the boot sequence rule indicates a relative restoration priority between a first VM and a second VM.

6. The method as recited in claim 1, wherein the information is gathered during performance of the proposed boot sequence.

7. The method as recited in claim 1, further comprising using the information gathered concerning performance of the proposed boot sequence as a basis for modifying the proposed boot sequence to create a new boot sequence.

8. The method as recited in claim 1, wherein performing the proposed boot sequence comprises restoring a plurality of production site VMs in an order specified by the proposed boot sequence.

9. The method as recited in claim 1, wherein the VM metadata comprises information concerning the performance of one or more VMs.

10. The method as recited in claim 1, further comprising comparing expected results of implementation of the proposed boot sequence with the information that was gathered concerning performance of the proposed boot sequence.

11. A non-transitory storage medium having stored therein computer-executable instructions which, when executed by one or more hardware processors, perform the operations:
    receiving input concerning a boot order sequence, wherein the input comprises VM (virtual machine) metadata;
    after receiving the input concerning the boot order sequence, entering a training phase which comprises generating a boot sequence rule based on the input;
    after entering the training phase, using the boot sequence rule to generate a proposed boot sequence;
    after generating the proposed boot sequence, performing the proposed boot sequence; and
    after performing the proposed boot sequence, gathering information concerning performance of the proposed boot sequence.

12. The non-transitory storage medium as recited in claim 11, wherein the input further comprises a default boot sequence.

13. The non-transitory storage medium as recited in claim 11, wherein the proposed boot sequence identifies an order in which a plurality of VMs are to be restored.

14. The non-transitory storage medium as recited in claim 13, wherein the order identified by the proposed boot sequence is based upon a respective application type with which each of the plurality of VMs is associated.

15. The non-transitory storage medium as recited in claim 11, wherein the boot sequence rule indicates a relative restoration priority between a first VM and a second VM.

16. The non-transitory storage medium as recited in claim 11, wherein the information is gathered during performance of the proposed boot sequence.

17. The non-transitory storage medium as recited in claim 11, wherein the operations further comprise using the information gathered concerning performance of the proposed boot sequence as a basis for modifying the proposed boot sequence to create a new boot sequence.

18. The non-transitory storage medium as recited in claim 11, wherein performing the proposed boot sequence comprises restoring a plurality of production site VMs in an order specified by the proposed boot sequence.

19. The non-transitory storage medium as recited in claim 11, wherein the VM metadata comprises information concerning the performance of one or more VMs.

20. The non-transitory storage medium as recited in claim 11, wherein the operations further comprise comparing expected results of implementation of the proposed boot sequence with the information that was gathered concerning performance of the proposed boot sequence.

* * * * *